Patented Oct. 23, 1934

1,977,988

UNITED STATES PATENT OFFICE 1,977,988

RECOVERY OF FATTY ACIDS

Hans Franzen, Mannheim, and Guenther Kunze, Oppau, Germany

No Drawing. Application May 6, 1931, Serial No. 535,574. In Germany May 16, 1930

7 Claims. (Cl. 202—52)

The present invention relates to the recovery of fatty acids from the products of the destructive oxidation hydrocarbons.

We have found that the crude mixture of aliphatic carboxylic acids obtainable from the products of a destructive oxidation with gaseous oxidizing agents, such as oxygen or air, of difficultly volatile, non-aromatic hydrocarbons, such as petroleum, fractions thereof, as for example middle oils, solid or liquid paraffin wax or oil fractions containing the same, and like hydrocarbon mixtures, can be freed in a very advantageous manner from hydroxy carboxylic acids and their derivatives by treating the crude mixture at elevated temperatures, such as between about 150° and about 300° C. under reduced pressure, as for example from 10 to 50 millimetres mercury gauge with a spray of finely divided liquids, preferably boiling below 105° C. at atmospheric pressure, such as water, benzine, benzene, trichlorethylene, ethyl alcohol and like organic liquids inert to the initial materials, for example in the form of dust or mist and, if desired with an inert gaseous carrier. In this manner a practically quantitative separation takes place between the fatty acids from hydroxycarboxylic acids, estolides (inner esters of hydroxycarboxylic acids containing the group

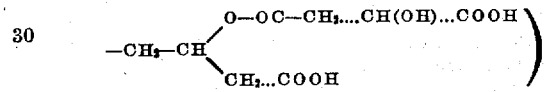

and other by-products of the oxidation still present in the mixture, and this is of importance because the hydroxycarboxylic acids and their derivatives unfavourably influence the value of the mixtures, as for example their capacity for being salted out in the preparation of soaps, their colour and their smell. Contrasted with other distilling processes, such as ordinary vacuum distillation or distillation with superheated steam, distillates practically free from hydroxycarboxylic acids are obtained. The hydroxycarboxylic acids and their derivatives remain in the distillation residue, and the distillates do not contain any decomposition products of the hydroxycarboxylic acids and their derivatives.

The treatment of the oxidation products in accordance with the present invention is so protective that chemical processes, such as splitting off water from the hydroxycarboxylic acids with the formation of unsaturated acids, formation of unsaponifiable substances, such as hydrocarbons or alcohols, by splitting off carbon dioxide, splitting of large molecules into smaller ones, and the like, such as occur in other distillation processes and which for many purposes, as for example by reason of the deterioration in the odour, are undesirable, do not take place. The fatty acids obtained are especially pale by reason of the protective course of the distillation. They have only a slight odour, because by the action of the small drops of liquid a particularly efficient deodorizing takes place.

For carrying out the process it is preferable to use a continuously operating apparatus, such as is described in the U. S. Patent No. 1,766,863. The injected liquid is either introduced through suitable nozzles, as for example according to the U. S. application, Ser. No. 334,183, filed by one of the present inventors on January 22, 1929, or while employing neutral gases or vapours, such as carbon dioxide, nitrogen or superheated steam, as carrier substances. Wet steam, which is a suspension of small drops of water in saturated steam, is especially suitable. Generally speaking it is advantageous to regulate a definite optimum ratio between the amounts of distillate and injected liquid, the said ratio being dependent on the nature of the product to be distilled and on the dimensions of the apparatus. When employing water, as for example with an apparatus according to the said Patent No. 1,766,863 having an hourly efficiency of 10 kilograms of distillate with an average molecular weight of the fatty acids of 250, the optimum amount of injected water is 12 kilograms and 140 kilograms with an apparatus having an hourly efficiency of 400 kilograms of distillate. The most favourable ratio of distillate to injected liquid is readily determined by experiment for each particular initial material and apparatus. When working below the optimum, the efficiency of the apparatus usually falls and the distillate usually has a marked odour and contains hydroxycarboxylic acids. If too much injected liquid be employed, the colour of the distillate may be impaired by particles of crude product carried over.

When working continuously, as for example according to the said Patent No. 1,766,863, a sufficient throughput speed must be ensured by withdrawing a quantity of residue corresponding to about 5 to 10 per cent of the crude initial material from the last reaction chamber. Thus the yield can only amount to the maximum of 90 to 95 per cent even if products which are completely volatile at the distillation temperature are subjected to distillation. Yields of 100 per cent of the theoretical yield may be obtained for such products, however, by adding to the material to be distilled before its entry into the distilling apparatus, substances which are liquid but not volatile at the working temperature. Suitable substances for this purpose are for example hydrocarbons of high boiling point, such as paraffin oil or soft paraffin wax, residues from a previous distillation and the like, for example in an amount of from 10 to 20 per cent of the initial material to be distilled. These additions, which may be repeatedly employed without injury, act as carrier liquids and render it possible to distill the fatty acids quantitatively from the crude material. This is especially advantageous in redistillations, in which otherwise a part of the distillation material remains as a residue, the yields not only being impaired but the properties of the distillate altered by difficultly volatile constituents remaining behind.

The following examples will further illustrate the nature of this invention, but the invention is not restricted to these examples.

Example 1

A crude mixture of aliphatic carboxylic acids having an average molecular weight of 250, and a content of 7.7 per cent of hydroxycarboxylic acids, (which are insoluble in petroleum ether), and obtained by oxidizing paraffin wax with air and recovered according to the U. S. application for Patent Ser. No. 399,090 of one of the present inventors and others, filed on October 11, 1929, by treating with a water-insoluble organic extraction agent the aqueous soap solution, which results from the treatment of the said oxidation products with basic agents and, if desired, from subsequent mechanical separation, of the greater part of the unsaponifiable materials present, separating a part of the soap solution, decomposing any emulsion of the remaining soap solution with the said extraction agent by adding small quantities of low molecular aliphatic alcohols and separating the layers formed, the soap solution being then worked into free acids, is treated continuously with saturated steam, laden with water mist of 55° C., at 280° C. and at a pressure of 28 millimeters mercury gauge. An almost odourless fatty acid mixture having a pale yellowish white colour and a content of 0.1 per cent of hydroxycarboxylic acids is obtained as the distillate in a yield of 92 per cent of the initial mixture of acids.

Example 2

An oxidation product obtained from the oxidation of Russian gas oil with the aid of air and having a content of 16.5 per cent of hydroxycarboxylic acids is treated at 260° C. at a pressure of 20 millimeters of mercury with a mist of trichlorethylene which has been obtained by leading carbon dioxide at 30° C. through a chamber filled with trichlorethylene. A pale yellow distillate having a content of hydroxycarboxylic acids of 0.2 per cent is obtained in a yield of 80 per cent of the intial mixture of acids.

Example 3

A crude mixture of acids from the so-called distillate oil of a paraffin wax oxidation (that is the low molecular constituents distilling over during the oxidation with the aid of air at about 140° to 160° C.) having a mean molecular weight of 160 and containing 2.6 per cent of hydroxycarboxylic acids are treated at from 240° to 250° C. and 18 millimetres mercury gauge with saturated steam laden with water mist of a temperature of 57° C. A pale yellow liquid consisting of fatty acids and free from hydroxycarboxylic acids is obtained in a yield of 95 per cent with reference to the initial acid mixture employed.

Example 4

Distillation fatty acids obtained by a direct distillation by heating of the acids from the oxidation of hard paraffin wax with the aid of air and containing 1 per cent of hydroxycarboxylic acids are well mixed with 20 per cent their weight of distillation residue obtained in the process described in Example 1 and treated continuously according to Example 1. Fatty acids free from hydroxycarboxylic acids and greatly improved in odour and colour are obtained in a yield of 99 per cent with reference to the initial acid mixture employed.

What we claim is:—

1. The process for the recovery of pure fatty acids from the acid products of the destructive oxidation, with gaseous oxidizing agents, of difficultly volatile, non-aromatic hydrocarbons, said products containing a substantial amount of hydroxy-carboxylic acids, which comprises introducing into said products a finely divided liquid inert thereto, at a pressure below atmospheric pressure and at a temperature above the boiling point of said liquid at the pressure employed, explosively converting said liquid into a vapor which substantially, selectively, distills off the fatty acids from said products without a conversion of said hydroxy-carboxylic acids, and collecting the distillate.

2. The process for the recovery of pure fatty acids from the acid products of the destructive oxidation, with gaseous oxidizing agents, of difficultly volatile, non-aromatic hydrocarbons, said products containing a substantial amount of hydroxy-carboxylic acids, which comprises introducing into said products a mixture of a finely divided liquid inert thereto and an inert gaseous carrier, at a pressure below atmospheric pressure and at a temperature above the boiling point of said liquid at the pressure employed, explosively converting said liquid into a vapor which substantially, selectively, distills off the fatty acids from said products without a conversion of said hydroxy-carboxylic acids, and collecting the distillate.

3. The process for the recovery of pure fatty acids from the acid products of the destructive oxidation, with gaseous oxidizing agents, of difficultly volatile, non-aromatic hydrocarbons, said products containing a substantial amount of hydroxy-carboxylic acids, which comprises introducing into said products a finely divided liquid, boiling below 105° C. at atmospheric pressure and inert to said products, at a pressure below atmospheric pressure and at a temperature above the boiling point of said liquid at the pressure employed, explosively converting said liquid into a vapor which substantially, selectively, distills off the fatty acids from said products without a conversion of said hydroxy-carboxylic acids, and collecting the distillate.

4. The process for the recovery of pure fatty acids from the acid products of the destructive oxidation, with gaseous oxidizing agents, of difficultly volatile, non-aromatic hydrocarbons, said products containing a substantial amount of hydroxy-carboxylic acids, which comprises introducing into said products finely divided water, at a pressure below atmospheric pressure and at a temperature above the boiling point of water at the pressure employed, explosively converting said water into steam which substantially, selectively, distills off the fatty acids from said products without a conversion of said hydroxy-carboxylic acids, and collecting the distillate.

5. The process for the recovery of pure fatty acids from the acid products of the destructive oxidation, with gaseous oxidizing agents, of difficultly volatile, non-aromatic hydrocarbons, said products containing a substantial amount of hydroxy-carboxylic acids, which comprises introducing into said products a mixture of finely divided water and an inert gaseous carrier, at a pressure below atmospheric pressure and at a temperature above the boiling point of water at the pressure employed, explosively converting said water into steam which substantially, selectively, distills off the fatty acids from said products without a conversion of said hydroxy-carboxylic acids, and collecting the distillate.

6. The process for the recovery of pure fatty acids from the acid products of the destructive oxidation, with gaseous oxidizing agents, of paraffin wax, said products containing a substantial amount of hydroxy-carboxylic acids, which comprises introducing into said products wet steam, at a pressure below atmospheric pressure and at a temperature above the boiling point of water, explosively converting the wet steam into dry steam which substantially, selectively, distills off the fatty acids from said products without a conversion of said hydroxy-carboxylic acids, and collecting the distillate.

7. The process for the recovery of pure fatty acids from the acid products of the destructive oxidation, with gaseous oxidizing agents, of paraffin wax, said products containing a substantial amount of hydroxy-carboxylic acids, which comprises introducing into said products wet steam at a pressure between 10 and 50 millimetres mercury gauge at between 150° and 300° C., explosively converting the wet steam into dry steam which substantially, selectively, distills off the fatty acids from said products without a conversion of said hydroxy-carboxylic acids, and collecting the distillate.

HANS FRANZEN.
GUENTHER KUNZE.

CERTIFICATE OF CORRECTION.

Patent No. 1,977,988.    October 23, 1934.

HANS FRANZEN, ET AL.

It is hereby certified that the above numbered patent was erroneously issued to the inventors whereas said patent should have been issued to I. G. Farbenindustrie Aktiengesellschaft, Frankfort-on-the-Main, Germany, as assignee of the entire interest in said invention, as shown by the records of assignments in this office; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.

a temperature above the boiling point of water at the pressure employed, explosively converting said water into steam which substantially, selectively, distills off the fatty acids from said products without a conversion of said hydroxy-carboxylic acids, and collecting the distillate.

5. The process for the recovery of pure fatty acids from the acid products of the destructive oxidation, with gaseous oxidizing agents, of difficultly volatile, non-aromatic hydrocarbons, said products containing a substantial amount of hydroxy-carboxylic acids, which comprises introducing into said products a mixture of finely divided water and an inert gaseous carrier, at a pressure below atmospheric pressure and at a temperature above the boiling point of water at the pressure employed, explosively converting said water into steam which substantially, selectively, distills off the fatty acids from said products without a conversion of said hydroxy-carboxylic acids, and collecting the distillate.

6. The process for the recovery of pure fatty acids from the acid products of the destructive oxidation, with gaseous oxidizing agents, of paraffin wax, said products containing a substantial amount of hydroxy-carboxylic acids, which comprises introducing into said products wet steam, at a pressure below atmospheric pressure and at a temperature above the boiling point of water, explosively converting the wet steam into dry steam which substantially, selectively, distills off the fatty acids from said products without a conversion of said hydroxy-carboxylic acids, and collecting the distillate.

7. The process for the recovery of pure fatty acids from the acid products of the destructive oxidation, with gaseous oxidizing agents, of paraffin wax, said products containing a substantial amount of hydroxy-carboxylic acids, which comprises introducing into said products wet steam at a pressure between 10 and 50 millimetres mercury gauge at between 150° and 300° C., explosively converting the wet steam into dry steam which substantially, selectively, distills off the fatty acids from said products without a conversion of said hydroxy-carboxylic acids, and collecting the distillate.

HANS FRANZEN.
GUENTHER KUNZE.

CERTIFICATE OF CORRECTION.

Patent No. 1,977,988.            October 23, 1934.

HANS FRANZEN, ET AL.

It is hereby certified that the above numbered patent was erroneously issued to the inventors whereas said patent should have been issued to I. G. Farbenindustrie Aktiengesellschaft, Frankfort-on-the-Main, Germany, as assignee of the entire interest in said invention, as shown by the records of assignments in this office; and that the said Letters Patent should be read with this correction therein that the same may conform to the record of the case in the Patent Office.

Signed and sealed this 12th day of February, A. D. 1935.

(Seal)            Leslie Frazer
                     Acting Commissioner of Patents.